United States Patent
Runkle et al.

(10) Patent No.: US 10,755,245 B2
(45) Date of Patent: Aug. 25, 2020

(54) MONEY TRANSFER SYSTEM HAVING LOCATION BASED LANGUAGE AND DYNAMIC RECEIPT CAPABILITIES

(71) Applicant: MoneyGram International, Inc., Dallas, TX (US)

(72) Inventors: Angela Marie Runkle, Maple Grove, MN (US); Michael E. Hermansen, Shorewood, MN (US); Elena Kuznetsov, Eden Prairie, MN (US); Lisa Minogue, Forest Lake, MN (US)

(73) Assignee: MoneyGram International, Inc., Dallas, TX (US)

( * ) Notice: Subject to any disclaimer, the term of this patent is extended or adjusted under 35 U.S.C. 154(b) by 175 days.

(21) Appl. No.: 13/775,970

(22) Filed: Feb. 25, 2013

(65) Prior Publication Data
US 2014/0244414 A1    Aug. 28, 2014

(51) Int. Cl.
*G06Q 20/10*    (2012.01)
*G06Q 20/18*    (2012.01)

(52) U.S. Cl.
CPC ............ *G06Q 20/10* (2013.01); *G06Q 20/18* (2013.01)

(58) Field of Classification Search
None
See application file for complete search history.

(56) References Cited

U.S. PATENT DOCUMENTS

| 5,326,960 A | 7/1994 | Tannenbaum |
| 5,432,326 A | 7/1995 | Noblett, Jr. et al. |
| 5,434,929 A | 7/1995 | Beernink et al. |
| 5,604,802 A | 2/1997 | Holloway |

(Continued)

FOREIGN PATENT DOCUMENTS

| EP | 1866861 A2 | 12/2007 |
| WO | WO9116691 A1 | 10/1991 |

(Continued)

OTHER PUBLICATIONS

"Money Transmitter Services", snapshot taken Oct. 2011, http://web.archive.org/web/20111012100544/http://www.dfs.ny.gov/consumer/usingamoneytrans.htm.*

(Continued)

*Primary Examiner* — Allen C Chein (57) ABSTRACT

A method for operating a transaction processing system to provide location based language capabilities and dynamic receipts in connection with money transfer services. One embodiment includes storing, in a database, information representative of transaction location based attributes and associated one or more languages, and storing information representative of receipt field attributes and associated receipt fields. Send and/or receive transaction requests from points of sale are received at a transaction processor. The received transaction requests are processed using the stored information in the database to identify transaction location attributes of the requests and the associated one or more languages, and processed using the information stored in the database to identify receipt field attributes of the requests and to determine the associated receipt fields. Receipt information representative of receipts provided in the identified one or more languages and having the determined fields is sent from the processor to the points of sale.

7 Claims, 3 Drawing Sheets

(56) References Cited

U.S. PATENT DOCUMENTS

| | | | |
|---|---|---|---|
| 5,864,483 A | 1/1999 | Brichta | |
| 5,920,848 A | 7/1999 | Schutzer et al. | |
| 5,949,044 A | 9/1999 | Walker et al. | |
| 5,974,146 A | 10/1999 | Randle et al. | |
| 6,010,067 A | 1/2000 | Elbaum | |
| 6,018,718 A | 1/2000 | Walker et al. | |
| 6,039,250 A | 3/2000 | Ito et al. | |
| 6,073,090 A * | 6/2000 | Fortune | G06F 9/4448 704/8 |
| 6,139,177 A | 10/2000 | Venkatraman et al. | |
| 6,205,433 B1 | 3/2001 | Boesch et al. | |
| 6,292,786 B1 | 9/2001 | Deaton et al. | |
| 6,370,514 B1 | 4/2002 | Messner | |
| 6,554,184 B1 | 4/2003 | Amos | |
| 6,661,466 B1 * | 12/2003 | Kou | H04N 5/60 348/465 |
| 6,687,679 B1 | 2/2004 | Van Luchene et al. | |
| 6,915,271 B1 | 7/2005 | Meyer et al. | |
| 6,938,013 B1 | 8/2005 | Gutierrez-Sheris | |
| 6,999,943 B1 | 2/2006 | Johnson et al. | |
| 7,050,983 B2 | 5/2006 | Kawai | |
| 7,083,087 B1 | 8/2006 | Gangi | |
| 7,213,744 B2 | 5/2007 | Michelsen et al. | |
| 7,258,268 B2 | 8/2007 | Steiger, Jr. | |
| 7,356,505 B2 | 4/2008 | March | |
| 7,386,518 B2 | 6/2008 | Cordery et al. | |
| 7,389,256 B1 | 6/2008 | Adams et al. | |
| 7,392,940 B2 | 7/2008 | Hansen et al. | |
| 7,406,445 B1 | 7/2008 | Silverbrook et al. | |
| 7,490,062 B2 | 2/2009 | Hansmann et al. | |
| 7,568,615 B2 | 8/2009 | Corona et al. | |
| 7,647,244 B2 | 1/2010 | Platner et al. | |
| 7,660,734 B1 | 2/2010 | Neal et al. | |
| 7,668,612 B1 * | 2/2010 | Okkonen | G06F 8/65 700/95 |
| 7,693,789 B2 | 4/2010 | Degen et al. | |
| 7,742,942 B2 | 6/2010 | Nicholson | |
| 7,761,344 B2 | 7/2010 | Smith | |
| 7,761,367 B1 | 7/2010 | Scalora et al. | |
| 7,797,192 B2 * | 9/2010 | Mitchell et al. | 705/16 |
| 7,810,067 B2 | 10/2010 | Kaelicke et al. | |
| 7,810,721 B2 | 10/2010 | Powell et al. | |
| 7,925,513 B2 | 4/2011 | Chao et al. | |
| 8,019,679 B2 | 9/2011 | Bennett et al. | |
| 8,065,213 B2 | 11/2011 | Rosenfield et al. | |
| 8,082,210 B2 | 12/2011 | Hansen et al. | |
| 8,090,594 B2 | 1/2012 | Grant et al. | |
| 8,108,977 B1 | 2/2012 | Miller | |
| 8,463,702 B2 | 6/2013 | Bennett et al. | |
| 8,566,237 B2 | 10/2013 | Forzley | |
| 8,571,980 B1 | 10/2013 | Greenwood | |
| 8,589,918 B1 * | 11/2013 | Sapuntzakis et al. | 718/1 |
| 8,646,685 B2 | 2/2014 | Bishop et al. | |
| 8,657,688 B1 | 2/2014 | Zouiten et al. | |
| 8,688,570 B2 | 4/2014 | Jones et al. | |
| 8,738,520 B2 | 5/2014 | Runkle et al. | |
| 8,788,278 B2 | 7/2014 | Scribner et al. | |
| 8,851,366 B2 | 10/2014 | Modi | |
| 9,076,134 B2 | 7/2015 | Grovit et al. | |
| 9,090,594 B2 | 7/2015 | Ge | |
| 9,092,763 B2 | 7/2015 | Meszaros et al. | |
| 9,751,006 B2 | 9/2017 | Zouiten et al. | |
| 9,943,761 B2 | 4/2018 | Zouiten et al. | |
| 10,192,204 B2 | 1/2019 | Christophersen et al. | |
| 10,232,268 B2 | 3/2019 | Zouiten et al. | |
| 10,402,795 B2 | 9/2019 | Nardone et al. | |
| 2001/0014868 A1 | 8/2001 | Herz et al. | |
| 2001/0029467 A1 | 10/2001 | Yagihashi et al. | |
| 2001/0039535 A1 | 11/2001 | Tsiounis et al. | |
| 2002/0002505 A1 | 1/2002 | Kojima | |
| 2002/0052778 A1 | 5/2002 | Murphy et al. | |
| 2002/0055907 A1 | 5/2002 | Pater et al. | |
| 2002/0062249 A1 | 5/2002 | Iannacci | |
| 2002/0091603 A1 | 7/2002 | Steiger et al. | |
| 2002/0111908 A1 | 8/2002 | Milberger et al. | |
| 2002/0143566 A1 | 10/2002 | Diveley | |
| 2002/0152177 A1 | 10/2002 | Wolf | |
| 2002/0179401 A1 * | 12/2002 | Knox | G06O 20/28 194/217 |
| 2003/0080185 A1 | 5/2003 | Werther | |
| 2003/0083891 A1 | 5/2003 | Lang et al. | |
| 2003/0110072 A1 | 6/2003 | Delurgio et al. | |
| 2003/0120590 A1 | 6/2003 | Ieshima et al. | |
| 2003/0130883 A1 | 7/2003 | Schroeder et al. | |
| 2003/0130948 A1 | 7/2003 | Algiene et al. | |
| 2003/0158818 A1 | 8/2003 | George et al. | |
| 2003/0182228 A1 | 9/2003 | Wolf | |
| 2003/0208384 A1 | 11/2003 | Nelson et al. | |
| 2003/0208440 A1 | 11/2003 | Harada et al. | |
| 2003/0220830 A1 | 11/2003 | Myr | |
| 2004/0030647 A1 | 2/2004 | Hansen et al. | |
| 2004/0107146 A1 | 6/2004 | Alfano | |
| 2004/0143496 A1 | 7/2004 | Saenz | |
| 2004/0167815 A1 | 8/2004 | DeLaHunt | |
| 2004/0172358 A1 | 9/2004 | Lent et al. | |
| 2004/0199462 A1 | 10/2004 | Starrs | |
| 2004/0205023 A1 | 10/2004 | Hafer et al. | |
| 2004/0230527 A1 | 11/2004 | Hansen et al. | |
| 2004/0241627 A1 | 12/2004 | Delfing | |
| 2005/0091155 A1 | 4/2005 | Pokta | |
| 2005/0131816 A1 | 6/2005 | Britto et al. | |
| 2005/0177496 A1 | 8/2005 | Blagg et al. | |
| 2005/0209961 A1 | 9/2005 | Michelsen et al. | |
| 2005/0246268 A1 | 11/2005 | Foran et al. | |
| 2006/0047672 A1 | 3/2006 | Habon et al. | |
| 2006/0074627 A1 * | 4/2006 | Moore et al. | 704/8 |
| 2006/0136907 A1 * | 6/2006 | Bennett | G06F 8/61 717/174 |
| 2006/0191994 A1 | 8/2006 | Steiger | |
| 2006/0242154 A1 | 10/2006 | Rawat et al. | |
| 2006/0253321 A1 | 11/2006 | Heywood | |
| 2006/0261150 A1 | 11/2006 | Seifert et al. | |
| 2006/0287953 A1 | 12/2006 | Chauhan | |
| 2007/0033112 A1 | 2/2007 | Nagle et al. | |
| 2007/0073617 A1 | 3/2007 | Tolbert et al. | |
| 2007/0083479 A1 * | 4/2007 | Swartz | G06Q 20/28 705/412 |
| 2007/0088010 A1 | 4/2007 | Huebler et al. | |
| 2007/0088610 A1 | 4/2007 | Chen | |
| 2007/0108271 A1 | 5/2007 | Degen et al. | |
| 2007/0121843 A1 | 5/2007 | Atazky et al. | |
| 2007/0203821 A1 | 8/2007 | DuFour | |
| 2007/0221728 A1 * | 9/2007 | Ferro et al. | 235/383 |
| 2007/0233615 A1 | 10/2007 | Tumminaro | |
| 2007/0255662 A1 | 11/2007 | Tumminaro | |
| 2007/0294116 A1 | 12/2007 | Stephens et al. | |
| 2008/0033870 A9 * | 2/2008 | Gutierrez-Sheris | G06Q 20/04 705/39 |
| 2008/0046381 A1 * | 2/2008 | Naccache | G06Q 20/1085 705/73 |
| 2008/0083826 A1 | 4/2008 | Henry et al. | |
| 2008/0109279 A1 | 5/2008 | Csoka | |
| 2008/0140568 A1 | 6/2008 | Henry | |
| 2008/0147506 A1 | 6/2008 | Ling | |
| 2008/0154719 A1 | 6/2008 | Gounares et al. | |
| 2008/0182228 A1 | 7/2008 | Hafez et al. | |
| 2008/0249908 A1 | 10/2008 | Lorberg et al. | |
| 2008/0275771 A1 * | 11/2008 | Levine | 705/14 |
| 2008/0301040 A1 | 12/2008 | Knudson et al. | |
| 2009/0006205 A1 | 1/2009 | Bixler et al. | |
| 2009/0006233 A1 | 1/2009 | Chemtob | |
| 2009/0006549 A1 | 1/2009 | Singh et al. | |
| 2009/0037311 A1 | 2/2009 | Omar | |
| 2009/0048980 A1 | 2/2009 | Hubsher | |
| 2009/0063261 A1 | 3/2009 | Scribner et al. | |
| 2009/0063331 A1 | 3/2009 | Rodin | |
| 2009/0067331 A1 | 3/2009 | Watsen et al. | |
| 2009/0089172 A1 * | 4/2009 | Quinlan et al. | 705/17 |
| 2009/0089869 A1 | 4/2009 | Varghese | |
| 2009/0100168 A1 * | 4/2009 | Harris | 709/224 |
| 2009/0106149 A1 | 4/2009 | Bennett et al. | |
| 2009/0157520 A1 | 6/2009 | Algiene et al. | |
| 2010/0100426 A1 | 4/2010 | Sander et al. | |
| 2010/0100477 A1 | 4/2010 | Giammanco | |

(56) References Cited

U.S. PATENT DOCUMENTS

| | | | |
|---|---|---|---|
| 2010/0114774 A1 | 5/2010 | Linaman et al. | |
| 2010/0153225 A1* | 6/2010 | Ferro et al. | 705/24 |
| 2010/0161485 A1 | 6/2010 | Bulawa et al. | |
| 2010/0235283 A1 | 9/2010 | Gerson | |
| 2010/0293113 A1 | 11/2010 | Munzer et al. | |
| 2010/0299761 A1 | 11/2010 | Shapiro | |
| 2011/0137796 A1 | 6/2011 | Tullis | |
| 2011/0213653 A1 | 9/2011 | Mesaros | |
| 2011/0246328 A1 | 10/2011 | Dunwoody et al. | |
| 2011/0282790 A1 | 11/2011 | Bennett et al. | |
| 2011/0313920 A1 | 12/2011 | Trickel | |
| 2012/0010993 A1 | 1/2012 | Ferrara et al. | |
| 2012/0016795 A1 | 1/2012 | Hill et al. | |
| 2012/0023008 A1 | 1/2012 | Owen et al. | |
| 2012/0030098 A1 | 2/2012 | Bulawa et al. | |
| 2012/0030100 A1 | 2/2012 | Bulawa et al. | |
| 2012/0036071 A1 | 2/2012 | Fulton et al. | |
| 2012/0209769 A1 | 8/2012 | Rolfs et al. | |
| 2012/0245987 A1 | 9/2012 | Isaacson et al. | |
| 2012/0303524 A1 | 11/2012 | Bertram et al. | |
| 2013/0060690 A1 | 3/2013 | Oskolkov et al. | |
| 2013/0073457 A1 | 3/2013 | Sander et al. | |
| 2013/0132067 A1* | 5/2013 | Gelbman | G06F 17/30669 704/8 |
| 2013/0151418 A1 | 6/2013 | Licciardello et al. | |
| 2013/0179334 A1 | 7/2013 | Nardone et al. | |
| 2013/0191194 A1 | 7/2013 | Shreibati et al. | |
| 2013/0282561 A1 | 10/2013 | Runkle et al. | |
| 2013/0325720 A1 | 12/2013 | Bennett et al. | |
| 2014/0095384 A1 | 4/2014 | Basha | |
| 2014/0207664 A1 | 7/2014 | Sander et al. | |
| 2014/0213345 A1 | 7/2014 | Zouiten et al. | |
| 2014/0250014 A1 | 9/2014 | Runkle et al. | |
| 2014/0278900 A1 | 9/2014 | Scribner et al. | |
| 2014/0279228 A1 | 9/2014 | Fry et al. | |
| 2015/0039499 A1 | 2/2015 | Christopherson et al. | |
| 2015/0149355 A1 | 5/2015 | Amthong et al. | |
| 2016/0047440 A1 | 2/2016 | Long et al. | |
| 2017/0361231 A1 | 12/2017 | Zouiten et al. | |
| 2019/0130370 A1 | 5/2019 | Christophersen et al. | |
| 2019/0156307 A1 | 5/2019 | Sander et al. | |
| 2019/0388788 A1 | 12/2019 | Zouiten et al. | |

FOREIGN PATENT DOCUMENTS

| | | | |
|---|---|---|---|
| WO | WO2001046778 | * | 6/2001 |
| WO | WO2009052365 A1 | | 4/2009 |

OTHER PUBLICATIONS http://files.consumerfinance.gov/f/201210_cfpb_small_business_guide.pdf.*

"Authoring Techniques for Device Independence W3C Working Group Note", Feb. 18, 2004, (Year: 2004).*

Lorna Priest, "Keyboard Installation and Use", Feb. 2009, available at https://scripts.sil.org/cros/scripts/page.php?site_id=nrsi&id=keyboardinstallationanduse (Year: 2009).*

Banorte Selects Moneygram for US Transfers—Mexico, Apr. 17, 2002, Business News Americas—Latin America's Business Information Leader, 1 page.

Information on MoneyGram.com 2003-2006, archived web pages printed from www.archive.org, Sep. 7, 2010.

International Search Report and Written Opinion issued in PCT/US2008/080292, dated Jan. 20, 2009, 14 pages.

International Search Report and Written Opinion issued in PCT/US2012/022491, dated Jul. 5, 2012, 10 pages.

International Search Report and Written Opinion issued in PCT/US2012/038607, dated Nov. 13, 2012, 20 pages.

International Search Report and Written Opinion issued in PCl/US2013/037595, dated Jul. 30, 2013, 11 pages.

MoneyGram Adds 1,500 Bancomer Locations in Mexico, Apr. 17, 2001, 2 pages.

MoneyGram Corporate—How to transfer money, MoneyGram. International, webpages from http://www.moneygram.com/MGICorp/ConsumerProducts . . . , 5 Pages; May 30, 2007.

Press release from Norkom Technologies, "Wall Street's Back Office Launches Market-Leading AML software from Norkom," Feb. 15, 2007, 2 pp., http://www.norkom.com.

Listingbook, LLC v. Market Leader, Inc., F.Supp.3d (2015), Westlaw 2015 WL 7176455, 12 pages.

Dr. Manuel Orozco. "The Remittance Marketplace: Prices, Policy and Financial Institutions." Pew Hispanic Center, Jun. 2004, 45 pages.

Bascom Global Internet Services, Inc. v. AT&T Mobility LLC, No. 15-1753 (Fed. Cir. Jun. 27, 2016), 26 pages.

Co-pending U.S. Appl. No. 11/846,323, filed Aug. 28, 2007, entitled "Consumer Database Loyalty Program for a Money Transfer System".

Co-pending U.S. Appl. No. 11/874,694, filed Oct. 18, 2007, entitled "Global Compliance Processing System for a Money Transfer System".

Commission Based on Net Profit, Jun. 13, 2006, Intuit Community.

Elham Ramezani, Mobile Payment, Jun. 2008, E-Business Technology, web, 1-18 (Year: 2008).

European Patent Office, "Notice from the European Patent Office dated Oct. 1, 2007 concerning business methods" Official Journal of the European Patent Office, vol. 30, No. 11, Nov. 1, 2007, pp. 592-593.

International Preliminary Report on Patentability received for PCT Patent Application No. PCT/US2008/080292, dated Apr. 20, 2010, 5 pages.

International Preliminary Report on Patentability received for PCT Patent Application No. PCT/US2012/022491, dated Aug. 29, 2013, 8 pages.

International Preliminary Report on Patentability received for PCT Patent Application No. PCT/US2012/038607, dated Dec. 5, 2013, 16 pages.

International Preliminary Report on Patentability received for PCT Patent Application No. PCT/US2013/037595, dated Nov. 6, 2014, 10 pages.

Office Action received for European Patent Application No. 08840274.8, dated May 7, 2015, 6 pages.

Office Action received for European Patent Application No. 12704470.9, dated Oct. 14, 2014, 8 pages.

* cited by examiner

INPUT THE AMOUNT TO SEND AND THE DESTINATION COUNTRY

AMOUNT: 20.00    SEND CURRENCY: USD
DESTINATION: PERU - PER
DESTINATION CITY: ---SELECT---
3RD PARTY TYPE: NONE
PROMOTION CODE:

TRANSACTION ONLY AVAILABLE FOR PICK-UP IN DESIGNATED STATE/PROVINCE

COUNTRY INFORMATION
CAPABILITY: SEND AND RECEIVE
PAYOUT CURRENCY: EUR, PEN, USD NOT ALL CURRENCY AVAILABLE AT ALL LOCATIONS
ELEKTRA DEL PERU SA THIS AGENT OFFERS US DOLLARS AND LOCAL CURRENCY PAYOUT SUBJECT TO AVAILABILITY
TRANSACTIONS SENT OR RECEIVED IN LIMA ARE SUBJECT TO A LOCAL GOVERNMENT TAX OF 0.10%. TRANSACTIONS SENT OR RECEIVED ANYWHERE ELSE IN THE COUNTRY ARE SUBJECT TO A GOVERNMENT TAX OF 0.6%

[BACK F11]  [NEXT F12]  [CANCEL ESC]

Fig. 5

PAY TO

FIRST NAME:
MIDDLE INITIAL:
LAST NAME:
ITALIAN CITIZEN: YES
TEST QUESTION:
TEST ANSWER:
MESSAGE 1:
MESSAGE 2:

[BACK F11]  [NEXT F12]  [CANCEL ESC]

MONEY TRANSFER SYSTEM HAVING LOCATION BASED LANGUAGE AND DYNAMIC RECEIPT CAPABILITIES

TECHNICAL FIELD

The present invention relates to money transfer systems.

BACKGROUND

A number of businesses offer money transfer and other services through points of sale such as a network of agents and computers. A consumer that desires to use the services to transfer money to a third party (i.e. a sender) takes the money or equivalent (e.g., a credit card) to a point of sale at the send location. The agent or computer accepts the money, obtains necessary information such as the consumer's identity and the identity of the third party transferee (i.e., a receiver), and initiates a send transaction. The money is then made available to the third party transferee at the receive location point of sale (e.g., by another agent or another computer). A transaction receipt is often provided to both the sender and the receiver. Money transfer businesses of these types are regulated by a number of different governmental and other organizations. They also operate in many different countries and therefore different languages. There remains a continuing need for improved money transfer systems. A system that enhances compliance with applicable regulatory requirements would be advantageous. A system that can conveniently yet accurately accommodate the multi-national nature of the system would also be desirable.

SUMMARY

Improved money transfer systems in accordance with embodiments of the invention have location based language and/or dynamic receipt capabilities. One embodiment of the invention is a method for operating a transaction processing system to provide money transfer services. The method includes storing transaction location based attributes and associated one or more languages in a database, receiving transaction requests from points of sale at a transaction processor, processing the received transaction requests with the transaction processor and using the stored information in the database to identify transaction location attributes of the requests and the associated one or more languages, and sending receipt information representative of receipts provided in the identified one or more languages.

Another embodiment of the invention includes storing information representative of receipt field attributes and associated receipt fields in a database, receiving transaction requests from points of sale at a transaction processor, processing the received transaction requests with the transaction processor and using the information stored in the database to identify receipt field attributes of the requests and determine the associated receipt fields, and sending receipt information representative of receipts providing the determined fields.

While the invention is amenable to various modifications and alternative forms, specific embodiments have been shown by way of example in the drawings and are described in detail below. The intention, however, in not to limit the invention to the particular embodiments described. On the contrary, the invention is intended to cover all modifications, equivalents, and alternatives falling within the scope of the invention as defined by the appended claims.

DETAILED DESCRIPTION

Figure 1:
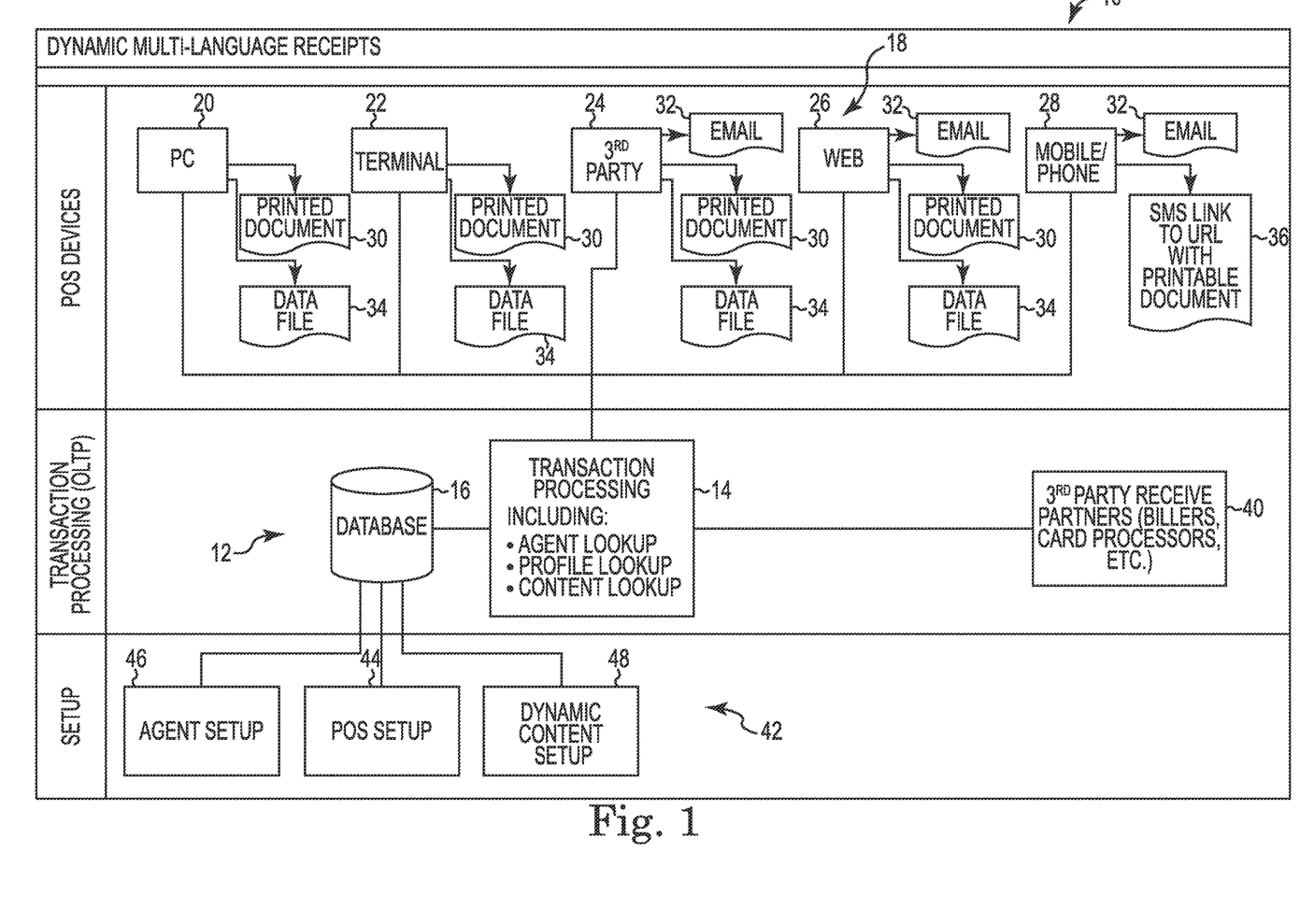
FIG. 1 is a schematic illustration of an embodiment of a money transfer system that can include location based language and dynamic receipt capabilities in accordance with embodiments of the invention.

FIG. 1 is a schematic illustration of an embodiment of physical components of a money transfer system 10 that can include various location based language and dynamic receipt capabilities in accordance with embodiments of the invention. As shown, the money transfer system 10 includes a transaction processing system 12 that is operated by or on behalf of the business providing the money transfer services. The processing system 12 includes a processor system 14 and data storage such as database 16 in the illustrated embodiment. A number of different remotely located point of sale devices 18 through which consumers such as money senders, money receivers and agents can interact with the money transfer system 10 are interfaced to the processor system 14 through communication channels. A PC 20 (e.g., a computer running an agent interface application provided by the money transfer service business), terminal 22 (e.g., in a kiosk or at an agent location), third party terminal 24 (e.g., a check out terminal at a third party retailer), web interface 26 (e.g., from a user's home computer) and mobile device 28 (e.g., "smart phone") are shown as non-limiting examples of point of sale devices 18. Depending on the nature of the point of sale devices 18, they can generate and provide transaction receipts to senders and receivers in the form of one or more of printed documents 30, email 32 that can be electronically stored and/or transmitted, and data files 34 that can be stored and/or displayed on the associated device. The transaction receipts can take still other forms in other embodiments of the invention. For example, an SMS (short message service or "text message") link 36 to a URL (uniform resource locator) with a printable document can be used in connection with the mobile device 28. In embodiments of the invention, the transaction receipts are provided in languages and/or with fields specified by the processing system 12 and based on factors or attributes of the transactions.

Other third party "partners" of the business operating the money transfer system 10 can interface with the processor system 14 through other communication channels via electronic interfaces 40. For example, third party billers such as credit card processors, and goods and service providers such as banks and utilities that offer their customers payment options through the money transfer system 10, may communicate with the processor system 14. System maintenance, control, and setup operations can be performed by or on behalf the business operating the system 10 through still other interfaces 42 coupled to the processor system 14 through communication channels. The illustrated embodiment, for example, includes a POS setup interface 44 through which an administrator using a computer can set up and enable point of sale devices 18 to make use of the system 10. Similarly, representatives of the business operating system 10 can set up new agents on to point of sale devices 18 through agent setup interface 46. Content, other information and rules, including that used in connection with the location based language and dynamic receipt capabilities can be inputted through content setup interface 48.

Transaction processing system 12, point of sale devices 18 and interfaces 42 can be implemented in any of a wide range of physical forms. For example, the database 16 can include a database of customer information, a database of rules information controlling the operation of money transfers including attributes and associated information relating to the location based language and dynamic receipt capabilities, and content such as promotional and other messages, supported language lists, regulator information, locations, taxes and fees and other information used by the system 10. The transaction processor 14 can process send and receive transaction requests received from the point of sale devices 18 and generate transaction responses to those requests based on the information in the requests and stored in the database 16. Embodiments of money transfer system 10 provide money transfer requests and other functionality disclosed in the Bennett et al. U.S. Patent Application Publication 2009/0106149 entitled Global Compliance Processing System For A Money Transfer System, the Fulton et al. U.S. Patent Application Publication 2012/0036071 entitled Verification Methods For Fraud Prevention In Money Transfer Receive Transactions, the Sander et al. U.S Patent Application Publication 2010/0100426 entitled Agent Management System, the Scribner et al. U.S. Patent Application Publication 2009/0063261 entitled Consumer Database Loyalty Program For A Money Transfer System, and U.S. Patent Application Publication 2008/0140568 entitled Method And Apparatus For Distribution Of Money Transfers. The above-identified U.S. patent application publications are incorporated herein by reference for all purposes.

Figure 2:
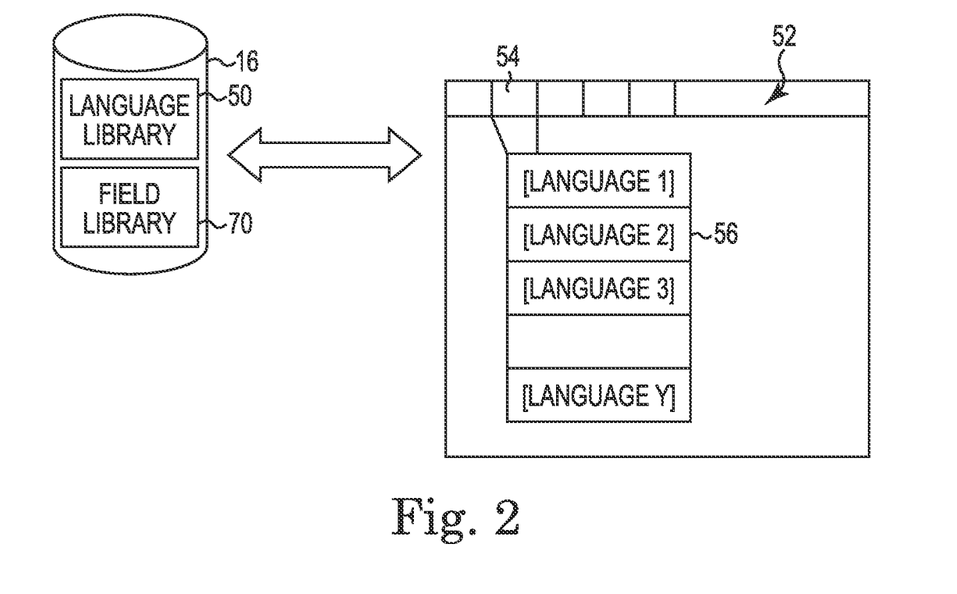
FIG. 2 is a schematic illustration of an example of a user interface provided by the system shown in FIG. 1.

Money transfer system 10 enables transactions at the locations of points of sale 18 throughout the world. In connection with this functionality and as shown in FIG. 2, database 16 includes a library 50 of languages that are supported by the system 10. An operator setting up the operation of one or more points of sale 18 (e.g., through POS setup interface 44) can use a user interface 52 to select a tab 54 that will provide a drop down or other list 56 of supported languages. The user can then select the languages that will be available or assigned to the user at the associated point of sale 18. The selected or assigned languages can be stored in database 16, along with attributes of the transactions associated with those languages (e.g., the location of the associated point of sale 18). Similarly, languages supportable by existing points of sale 18 can be modified using the user interface shown in FIG. 2. For example, when setting up a user for a point of sale 18 located in the United States, the user might select English and Spanish as languages. In other embodiments of the invention the languages available for a given point of sale 18 may be limited or assigned based on the location of the point of sale. For example, if the point of sale 18 being set up is in France, only French and English may be available for selection. If the point of sale 18 being set up is in Peru, the system 10 may automatically configure the languages for the point of sale by assigning Spanish, English and French, and may not provide the user with selection options. Embodiments of database 16 can also include default languages that are assigned to points of sale 18. Default languages can, for example, be based on the country or other region in which the point of sale 18 is located.

Figure 3:
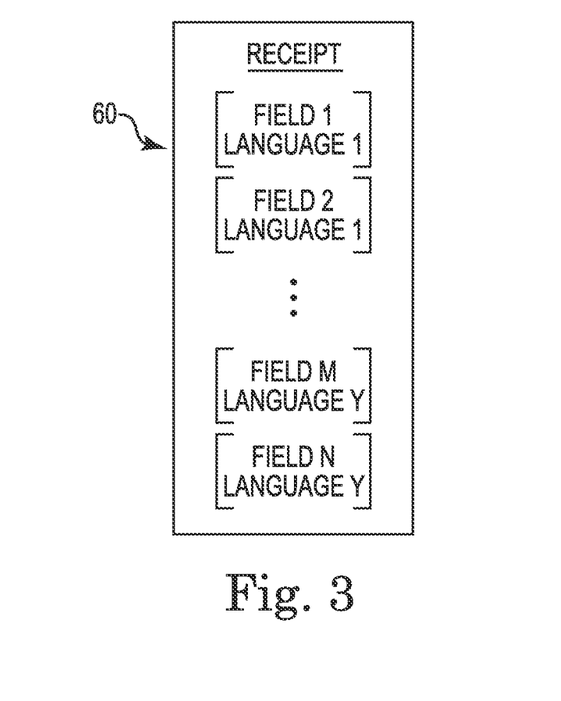
FIG. 3 is a schematic illustration of an example of a receipt with location based languages and dynamic fields that can be provided by embodiments of the system shown in FIG. 1.

FIG. 3 is a schematic illustration of a receipt 60 that can be generated and provided at a point of sale 18 in connection with send and/or receive transactions at the point of sale. As shown, the information on the receipt 60 is provided in several different languages. In other embodiments the receipt 60 is provided in only one language. The language(s) of the receipt 60 can be those stored in the database 16 that have been selected or assigned to the point of sale 18 in the manner described above (i.e., the transaction processing system 12 sends commands to the point of sale 18 defining the languages to be provided on the receipts. In some embodiments the system 10 is configured to cause the receipts 60 to be provided in the default language or all the languages selected or assigned to the point of sale 18. In other embodiments the system 10 will provide the user at the point of sale 18 with a user interface (e.g., similar to that shown in FIG. 2) that allows the user to select a subset of the available languages (e.g., the languages assigned to the point of sale). Continuing the above example of a point of sale 18 in Peru, for example, the user may be provided a drop down list of Spanish, English and French, and the user may select only one or two of these languages for the receipt 60. In other embodiments where the point of sale 18 is assigned less than or equal to a predetermined number of languages (e.g., two languages), the point of sale may be required by the transaction processing system 10 to print receipts in all the assigned languages (e.g., the user is not allowed to select a subset of the assigned languages for a given receipt).

These location based language capabilities of the money transfer system 10 effectively provide options on how individual points of sale 18 can use languages. It can, for example, determine a default language to print with every transaction. It provides the ability to control if a point of sale can select languages for the receipts 60. It provides the ability to control how many languages can be provided on receipts with each transaction. It also provides the ability to receive a corridor (e.g., country, region, city or some geographic area) and to use that corridor to specify the languages on the receipt.

In embodiments of the money transfer system 10, points of sale 18 can only select from assigned languages. Points of sale 18 at locations with only two languages might not be required or able to select languages for the receipt (i.e., the receipt can by default and without other options be provided in the two languages). Points of sale 18 having three or more available languages can be provided with the option to select the desired languages for the receipt in connection with each transaction.

Reports generated or provided in connection with points of sale 18 can also make use of the languages selected or assigned in the manner described above. For example, the reports can be generated and provided based on the languages selected or assigned to the location. In other embodiments reports can be generated and provided based on the languages used for individual transactions (e.g., reports can be generated based on the language of the receipts of the transactions). Auditing and compliance monitoring can be enhanced through the use of reports of these types. Marketing efforts can also be tailored to specific users and groups based on reports of these types.

As shown in FIG. 3, money transfer system 10 can also provide receipts 60 having dynamic or different fields (e.g., information of different types or nature). Non-limiting examples of the different fields that can be provided are applicable state or other location regulator contact information and information about the transaction such as applicable taxes or other fees. The fields on the receipts 60 can be based on any one or more of a variety of transaction attributes including but not limited to the languages assigned to the associated points of sale 18 stored in database 16, the locations of the points of sale or currency of the send transactions, sender-specific information, the locations of the points of sale or currency of the receive transactions, and receiver-specific information. Information regarding the dynamic fields, including rules and attributes specifying the bases for determining which specific fields are to be provided on the receipts, and the specific information to be included in the fields, can be stored in a field library 70 of the database 16.

One or more regulators may have jurisdiction over any given send and receive transaction. Information on regulators (e.g., agency name, phone number and website address) can be stored in database 16, as well as the rules or other information that define the relationships between transaction attributes and applicable regulators (e.g., the location of the point of sale 18 of the send transaction or the location of the point of sale of the receive transaction).

Dynamic fields can be based on attributes related to the send transactions. For example, the fields provided on receipts 60 can be based on information provided by the sender when staging a transaction at a terminal such as 22 operated by an agent at a point of sale 18. Information provided by the sender during the staging of the send transaction may prompt additional information requests from the sender. Fields provided on receipts 60 for send transactions staged on-line (e.g., through web interface 26) can be based on the stored profile of the sender (e.g., the senders name, address, nationality, etc., that is stored in database 16 as a regular user or in connection with a loyalty program). Fields provided on receipts 60 for send transactions staged on-line can also be based on attributes of the point of sale 18 such as the IP (internet protocol) address, MAC (media access control) address or the type of the device.

Dynamic fields can be based on attributes related to the receive transactions. For example, the fields provided on receipts 60 can be based on information provided by the sender about the receiver when staging a transaction at a terminal such as 22 operated by an agent at a point of sale 18. Information about the receiver provided by the sender during the staging of the send transaction may prompt additional information requests from the sender. Rules and/or regulations of the location of the point of sale 18 of the receive transaction can define the fields that are or must be provided on the receipts 60. Taxes and/or fees imposed by the location of the receive transaction can define the fields that are provided on the receipts 60. Certain partners of the operator of the money transfer system 10 can specify fields to be printed on receipts 60. For example, the partner may require a marketing information field on receipts 60 provided to its customers. Fields provided on receipts 60 for receive transactions can be based on the stored profile of the receiver (e.g., the receivers name, address, nationality, etc. that is stored in database 16 as a regular user or in connection with a loyalty program). Embodiments of the invention also provide fields on receipts 60 based on the type of point of sale 18 at which the receive transaction takes place, and/or the currency of the receive transaction.

Figure 4:
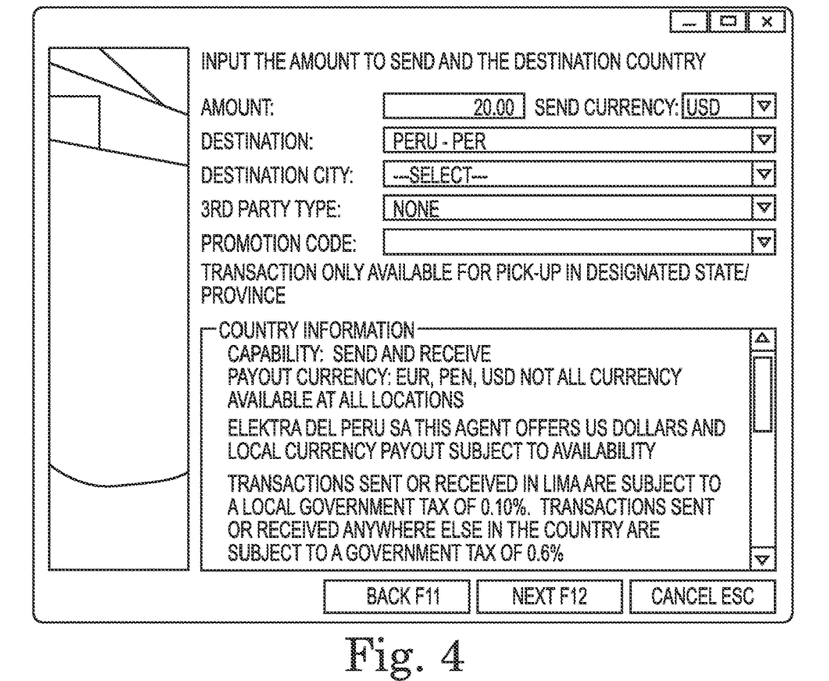
FIG. 4 is a schematic illustration of an example of a user interface that can be provided by the system shown in FIG. 1.

FIG. 4 is an illustration of a user interface that can be presented to a user of a point of sale device 18 when staging a send transaction in accordance with an embodiment of the invention. In this example a send transaction from the United States (e.g., New York) to Peru is being staged. The transaction is being set up for a receive transaction through a point of sale 18 of an agent that is set up to print receipts in English and French. Transaction fees for money transfers to Peru may be based on the city in which the receiver picks up the money. By way of example, a receive transaction completed in Lima may have a first or 3% fee, and a receive transaction completed in a city outside of Lima may have a second or 1% fee. Similarly, taxes can be dependent on the city where the receive transaction is completed. When staging the send transaction the agent or other person (such as the sender of the money) is asked in what city the receive transaction will be completed (i.e., the destination city), and that city is entered into the system 10 through the user interface. As shown in FIG. 4, the user interface can include a drop-down menu of cities the operator can select from. As also shown in FIG. 4, the user interface can present information describing the city-specific features of the receive transaction. In this example, the receipt printed or otherwise provided to the sender in New York will be in English and French languages, with New York specific state regulator information. The receipt provided to the sender will also reflect the receive amount based on the fee of the selected destination city (i.e., 3% in Lima). The information that enables these location based languages and dynamic receipt capabilities is stored in database 16 as described above.

As another example, a credit card company (i.e., a biller) that contracts with the operator of the money transfer system 10 to receive payments through the money transfer system can request that certain information such as promotional messages be printed on the receipts provided to the biller's account holders that make payments through the system. For example, in some embodiments receipts for all payments made between certain dates can have a promotional message. In other embodiments these dynamic receipts can be customized to specific attributes of the payment transaction. For example, system 10 can be configured to print a message identifying the specific awards granted by the credit card company in response to specific payments. If the system is configured to provide receipts with promotional messages identifying the bonus awards for all payments greater than, e.g., $500, the receipt provided to a sender of a $600 payment can thank the sender for the $600 payment, and congratulate the sender on the additional xxx points ($600 worth of points) earned by the payment.

Figure 5:
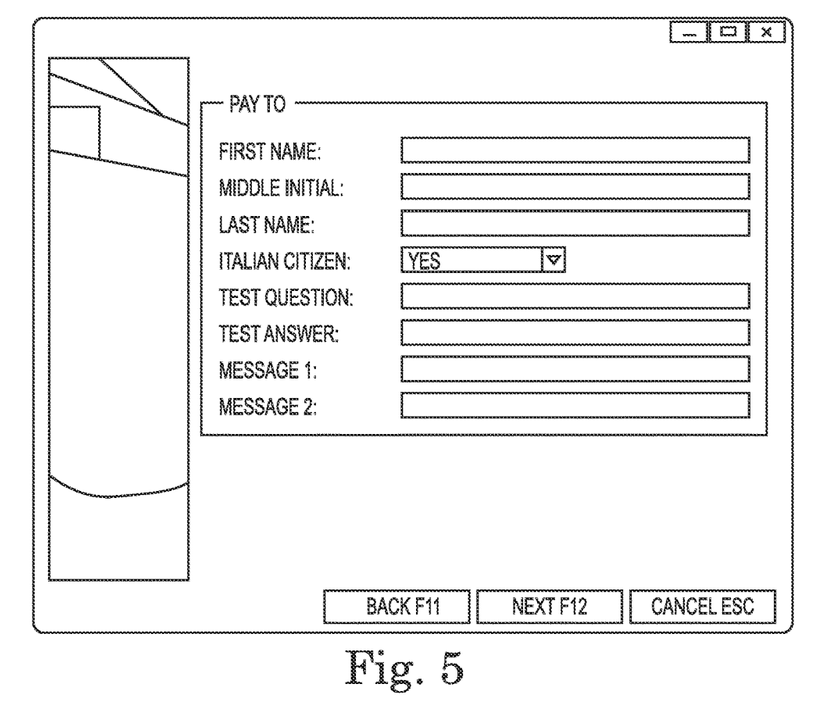
FIG. 5 is a schematic illustration of an example of a user interface that can be provided by the system shown in FIG. 1.

FIG. 5 is an illustration of a user interface that can be presented to a user of a point of sale device 18 when staging a send transaction in accordance with an embodiment of the invention. In this example a send transaction from the United States (e.g., Wisconsin) to Italy is being staged at an agent location set up to print or otherwise provide receipts in English and French. The agent is also set up to print or otherwise provide disclosures in a language based on the country to which the money is being sent (Italy and Italian in this example). As shown in FIG. 5, the sender is asked if the receiver is a citizen of the country in which the receive transaction will be completed (Italy in this example). Receivers in Italy who are citizens pay a first fee, such as 1 EUR, on receive transactions, while non-citizens pay a second fee such as 5 EUR. The receipt provided to the sender in Wisconsin has Wisconsin specific state regulator information and shows the receive amount base on the 1 EUR (citizen) tax. The receipt at the send location is provided in English, French and Italian.

As another example, a sender in the United States, such as California, is using a point of sale 18 such as PC 20 to transfer money from a credit card or Pay Pal account to a bank account in Mexico. System 10 is configured to recognize that funds deposited in U.S. dollars are subject to a fee such as $5, while deposits in the local currency of Pesos are free of this fee. When the sender signs into the system 10 to stage the transaction using an IP address located in California, the system 10 will recognize the need to charge this fee. The receipt provided to the sender has California specific state regulator information, and the receive amount is based upon the $5 fee. In other embodiments in which the funds transferred are Pesos, the receipt reflects a receive amount base on no fee.

Although the present invention has been described with reference to preferred embodiments, those skilled in the art will recognize that changes can be made in form and detail without departing from the spirit and scope of the invention.

What is claimed is:

1. A method for operating a transaction processing system to provide money transfer services through points of sale, comprising:

storing available receipt languages in a database associated with the transaction processing system;

storing location based attributes of each of a plurality of points of sale associated with the transaction processing system in the database, wherein the location based attributes comprise rules determining receipt languages available to a point of sale based on a location of the point of sale;

associating one or more default languages with each of the plurality of points of sale during a set-up of the plurality of points of sale, wherein the one or more default languages are based on the location based attributes of each of the plurality of points of sale;

storing the one or more default languages in the database;

storing information representative of receipt field attributes and associated receipt fields for each of the plurality of points of sale in a database based on rules associated with locations of the plurality of points of sale, wherein the stored information includes information representative of one or more of physical point of sale locations, sender profile for transactions at online point of sale locations, and device identification including IP address for transactions at online point of sale locations, wherein the stored information includes information representative of regulators associated with the received transaction requests, information representative of the point of sale locations of send transaction requests and associated receipt fields, and information representative of receive locations of the send transaction requests and associated receipt fields, and wherein the stored information includes taxes and/or fees associated with the receive locations and one or more of rules and regulations associated with the receive locations;

providing the one or more of rules and regulations associated with the receive locations to user interfaces of the plurality of points of sale based on the rules associated with locations of the points of sale specifying the one or more of rules and regulations associated with the receive locations;

receiving selected rules and regulations of the one or more rules and regulations from the plurality of points of sale;

providing subsets of the available receipt languages to respective user interfaces of the plurality of points of sale during the set-up of the plurality of points of sale based on the rules determining the receipt languages available to the plurality of points of sale, wherein each subset is based on the location based attributes of each of the plurality of points of sale;

providing, to the user interfaces of the plurality of points of sale, a selectable number of total receipt languages that appear on the receipts of the plurality of points of sale;

receiving a selected total number of receipt languages that appear on the receipts;

limiting the number of selected transaction receipt languages to the received selected total number;

receiving selected set-up receipt languages of the subsets of the available receipt languages from the plurality of points of sale associated with the transaction processing system, wherein the number of the selected set-up receipt languages are limited to the received selected total number on the plurality of points of sale;

storing the received selected set-up receipt languages from the plurality of points of sale in the database;

receiving a transaction request from at least one of a plurality of points of sale at the transaction processing system;

identifying the stored one or more default languages and the stored selected set-up receipt languages for the at least one of the plurality of points of sale in response to receiving the transaction request;

identifying a type of point of sale of the at least one of the plurality of points of sale, wherein the number of the selected set-up receipt languages on the identified point of sale is limited to the received selected total number on the plurality of points of sale;

providing the identified one or more default languages and the identified selected set-up receipt languages to a user interface of the at least one of the plurality of points of sale during the transaction request;

processing the received transaction request with the transaction processing system and using the information stored in the database to identify receipt field attributes of the received transaction requests and determine the associated receipt fields, including identifying regulators of the requested transactions, identifying the receipt fields of the received transaction requests based on the point of sale locations of the send transaction requests, identifying the receipt fields of the received transaction requests based on the types of points of sale of the plurality of points of sale, and identifying the receipt fields of the received transaction requests based on the receive locations of the send transaction requests; and sending receipt information representative of a receipt in the identified one or more default languages and the identified selected set-up receipt languages to the at least one of the plurality of points of sale, wherein the receipt information includes one or more fields based on the identified type of point of sale of the at least one of the plurality of points of sale and includes information representative of receipts providing regulator fields having information representative of the identified regulators, receipts providing fields having information based on the point of sale locations of the received transaction requests, receipts providing fields having information based on the types of points of sale of the plurality of points of sale, receipts providing fields having information based on the receive locations of the send transaction requests, and receipts providing rules and regulation fields having information representative of the received selected one rules and regulations.

2. A method for operating a transaction processing system to provide money transfer services through points of sale, comprising:

receiving transaction requests from a plurality of points of sale at the transaction processing system;

providing to the plurality of points of sale a selectable number of total receipt languages that appear on receipts of the points of sale;

receiving a selected total number of receipt languages that appear on the receipts;

limiting the number of selected transaction receipt languages to the received selected total number;

storing information representative of receipt field attributes and associated receipt fields for each of the plurality of points of sale in a database based on rules associated with locations of the plurality of points of sale, wherein the stored information includes information representative of one or more of physical point of sale locations, sender profile for transactions at online point of sale locations, and device identification including IP address for transactions at online point of sale locations, wherein the stored information includes information representative of regulators associated with the received transaction requests, information representative of the point of sale locations of send transaction requests and associated receipt fields, and information representative of receive locations of the send transaction requests and associated receipt fields, and wherein the stored information includes taxes and/or fees associated with the receive locations and one or more of rules and regulations associated with the receive locations;

providing the one or more of rules and regulations associated with the receive locations to user interfaces of the plurality of points of sale based on the rules associated with locations of the points of sale specifying the one or more of rules and regulations associated with the receive locations;

receiving selected rules and regulations of the one or more rules and regulations from the plurality of points of sale;

identifying each type of point of sale of the plurality of points of sale, wherein the number of the selected set-up receipt languages are limited to the received selected total number on the plurality of points of sale;

processing the received transaction requests with the transaction processing system and using the information stored in the database to identify receipt field attributes of the received transaction requests and determine the associated receipt fields, including identifying regulators of the requested transactions, identifying the receipt fields of the received transaction requests based on the point of sale locations of the send transaction requests, identifying the receipt fields of the received transaction requests based on the types of points of sale of the plurality of points of sale, and identifying the receipt fields of the received transaction requests based on the receive locations of the send transaction requests; and sending receipt information representative of receipts providing the determined fields, including information representative of receipts providing regulator fields having information representative of the identified regulators, receipts providing fields having information based on the point of sale locations of the received transaction requests, receipts providing fields having information based on the types of points of sale of the plurality of points of sale, receipts providing fields having information based on the receive locations of the send transaction requests, and receipts providing rules and regulation fields having information representative of the received selected one rules and regulations.

3. The method of claim 2 wherein the stored information includes one or more of rules and regulations associated with send locations, taxes and/or fees associated with the send locations, currency of the send transaction requests, identity of the receiver and method of delivery of the send transaction requests.

4. The method of claim 2, wherein the stored information includes receiver profile, currency of receive transaction requests, identity of the sender and method of delivery of the receive transaction requests.

5. A method for operating a transaction processing system to provide money transfer services through points of sale, comprising:

obtaining a set of rules that determine dynamic fields to be outputted to a user interface of a point of sale associated with the transaction processing system, the set of rules being a function of a location of the point of sale and a stored profile of a user operating the point of sale;

storing information representative of receipt field attributes and associated receipt fields for the point of sale in a database based on rules associated with locations of the point of sale, wherein the stored information includes information representative of a physical point of sale location, sender profile for transactions at an online point of sale location, and device identification including IP address for transactions at the online point of sale location, wherein the stored information includes information representative of regulators associated with the received transaction requests, information representative of the point of sale location of send transaction requests and associated receipt fields, and information representative of receive locations of the send transaction requests and associated receipt fields, and wherein the stored information includes taxes and/or fees associated with the receive locations and one or more of rules and regulations associated with the receive locations;

providing the one or more of rules and regulations associated with the receive locations to user interface of the point of sale based on the rules associated with location of the points of sale specifying the one or more of rules and regulations associated with the receive locations;

receiving selected rules and regulations of the one or more rules and regulations from the point of sale;

providing, to the user interface of the point of sale, a selectable number of total receipt languages that appear on receipts of the point of sale;

receiving a selected total number of receipt languages that appear on the receipts of the point of sale;

providing, to the user interface of the point of sale, selectable set-up receipt languages available as receipt languages that appear on receipts of the point of sale;

receiving selected set-up receipt languages, wherein the number of the selected set-up receipt languages are limited to the received selected total number on the point of sale;

limiting the number of selected transaction receipt languages to the received selected total number;

obtaining the location of the point of sale and the stored profile of the user operating the point of sale, wherein the number of the selected set-up receipt languages are limited to the received selected total number on the point of sale;

identifying a type of point of sale of the point of sale;

generating dynamic fields to be displayed on the user interface based on the location of the point of sale, the type of point of sale, and the stored profile of the user operating the point of sale;

outputting the dynamic fields to the user interface of the point of sale; and sending receipt information representative of a receipt in the identified one or more default languages and the identified selected set-up receipt languages to the at least one of the plurality of points of sale, wherein the receipt information includes one or more fields based on the identified type of point of sale of the at least one of the plurality of points of sale and includes information representative of receipts providing regulator fields having information representative of the identified regulators, receipts providing fields having information based on the point of sale locations of the received transaction requests, receipts providing fields having information based on the type of point of sale, receipts providing fields having information based on the receive locations of the send transaction requests, and receipts providing rules and regulation fields having information representative of the received selected one rules and regulations.

6. The method of claim 5, wherein generating dynamic fields to be displayed on the user interface based on the location of the point of sale comprise default languages to be displayed on a transaction receipt of the point of sale.

7. The method of claim 5, wherein generating dynamic fields to be displayed on the user interface based on the location of the point of sale comprise rules and regulations of the location to be displayed on a transaction receipt of the point of sale.

* * * * *